United States Patent
Heseding et al.

(10) Patent No.: US 11,110,804 B2
(45) Date of Patent: Sep. 7, 2021

(54) DEVICE FOR A VEHICLE TRAILER, A SYSTEM WITH SAID DEVICE AND A METHOD FOR SAID DEVICE

(71) Applicant: WABCO GMBH, Hannover (DE)

(72) Inventors: Johannes Heseding, Hannover (DE); Gerd Schuenemann, Laatzen (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 0 days.

(21) Appl. No.: 17/055,166

(22) PCT Filed: May 13, 2019

(86) PCT No.: PCT/EP2019/062129
§ 371 (c)(1),
(2) Date: Nov. 13, 2020

(87) PCT Pub. No.: WO2019/219559
PCT Pub. Date: Nov. 21, 2019

(65) Prior Publication Data
US 2021/0221234 A1   Jul. 22, 2021

(30) Foreign Application Priority Data
May 15, 2018   (DE) ..................... 10 2018 111 683.7

(51) Int. Cl.
*B60L 15/20*   (2006.01)
*B62D 59/04*   (2006.01)

(52) U.S. Cl.
CPC .............. *B60L 15/20* (2013.01); *B62D 59/04* (2013.01); *B60L 2200/28* (2013.01); *B60L 2240/14* (2013.01); *B60L 2240/22* (2013.01); *B60L 2240/421* (2013.01); *B60L 2240/486* (2013.01); *B60L 2250/26* (2013.01)

(58) Field of Classification Search
CPC .......... B60L 15/20; B62D 59/04; B60W 20/00
See application file for complete search history.

(56) References Cited

U.S. PATENT DOCUMENTS

| | | | | |
|---|---|---|---|---|
| 3,860,081 | A * | 1/1975 | Moll | B62D 59/00 180/14.3 |
| 9,937,819 | B2 * | 4/2018 | Healy | B60L 7/18 |
| 10,245,972 | B2 * | 4/2019 | Healy | B60L 53/53 |
| 10,654,369 | B2 * | 5/2020 | Healy | B60K 17/356 |
| 10,821,853 | B2 * | 11/2020 | Healy | B60W 10/06 |

(Continued)

FOREIGN PATENT DOCUMENTS

| | | |
|---|---|---|
| DE | 102008043849 A1 | 5/2010 |
| EP | 3305574 A1 | 4/2018 |
| WO | WO 2010025101 A2 | 3/2010 |

*Primary Examiner* — John D Walters
*Assistant Examiner* — James J Triggs
(74) *Attorney, Agent, or Firm* — Leydig, Voit & Mayer, Ltd.

(57) ABSTRACT

A system for a vehicle trailer includes a function block having a data input configured to receive gear shift signals of a vehicle towing the vehicle trailer. The function block includes a controller configured to generate a torque increase request signal depending on a received gear shift signal of the gear shift signals, and a data output configured to output the torque increase request signal to an electric motor controller of at least one electric drive of the vehicle trailer.

17 Claims, 5 Drawing Sheets

(56) References Cited

U.S. PATENT DOCUMENTS

| | | |
|---|---|---|
| 2007/0193795 A1 | 8/2007 | Forsyth |
| 2010/0065344 A1* | 3/2010 | Collings, III ......... B60W 10/26 180/2.1 |
| 2011/0287888 A1 | 11/2011 | Muller et al. |
| 2018/0345952 A1* | 12/2018 | Layfield ................ B60W 30/02 |

* cited by examiner

DEVICE FOR A VEHICLE TRAILER, A SYSTEM WITH SAID DEVICE AND A METHOD FOR SAID DEVICE

CROSS REFERENCE TO RELATED APPLICATIONS

This application is a U.S. National Phase Application under 35 U.S.C. § 371 of International Application No. PCT/EP2019/062129, filed on May 13, 2019, and claims benefit to German Patent Application No. DE 10 2018 111 683.7, filed on May 15, 2018. The International Application was published in German on Nov. 21, 2019, as WO 2019/219559 A1 under PCT Article 21(2).

FIELD

The present disclosure is directed to a system for a vehicle trailer, a vehicle having such a system, and a method for operating such a system.

BACKGROUND

According to the prior art, towing vehicles for towing vehicle trailers are usually equipped with automated manual transmissions (AMT). A torque provided by an internal combustion engine of the towing vehicle is transmitted to wheels via the manual transmission in order to drive the towing vehicle. Such manual transmissions are not load switchable. Therefore, the clutch must be disengaged for every shifting operation of the gearbox, so that this results in a break in the torque delivery to the driven wheels. This results in a force interruption, which leads to uneven acceleration and loss of speed, especially in the case of articulated trucks or semi-trailers, and impairs driving comfort. In order to eliminate the loss of speed, additional fuel consumption is necessary.

From the prior art, dual-clutch transmissions are known, which greatly minimize an interruption of the traction force or an interruption of the torque delivery to the driven wheels, but due to high costs and increased system complexity are not usually used in utility vehicles. A source for this can be found, for example, in "Getriebetechnik: Chancen and Herausforderungen [Transmission Technology: Opportunities and Challenges]" by Christiane Brünglinghaus.

SUMMARY

In an embodiment, the present invention provides a system for a vehicle trailer. The system includes a function block having a data input configured to receive gear shift signals of a vehicle towing the vehicle trailer. The function block includes a controller configured to generate a torque increase request signal depending on a received gear shift signal of the gear shift signals, and a data output configured to output the torque increase request signal to an electric motor controller, of at least one electric drive of the vehicle trailer.

BRIEF DESCRIPTION OF THE DRAWINGS

The subject matter of the present disclosure will be described in even greater detail below based on the exemplary figures. The present disclosure is not limited to the exemplary embodiments. All features described and/or illustrated herein can be used alone or combined in different combinations in different embodiments. The features and advantages of various embodiments will become apparent by reading the following detailed description with reference to the attached drawings which illustrate the following.

DETAILED DESCRIPTION

Figure 1:
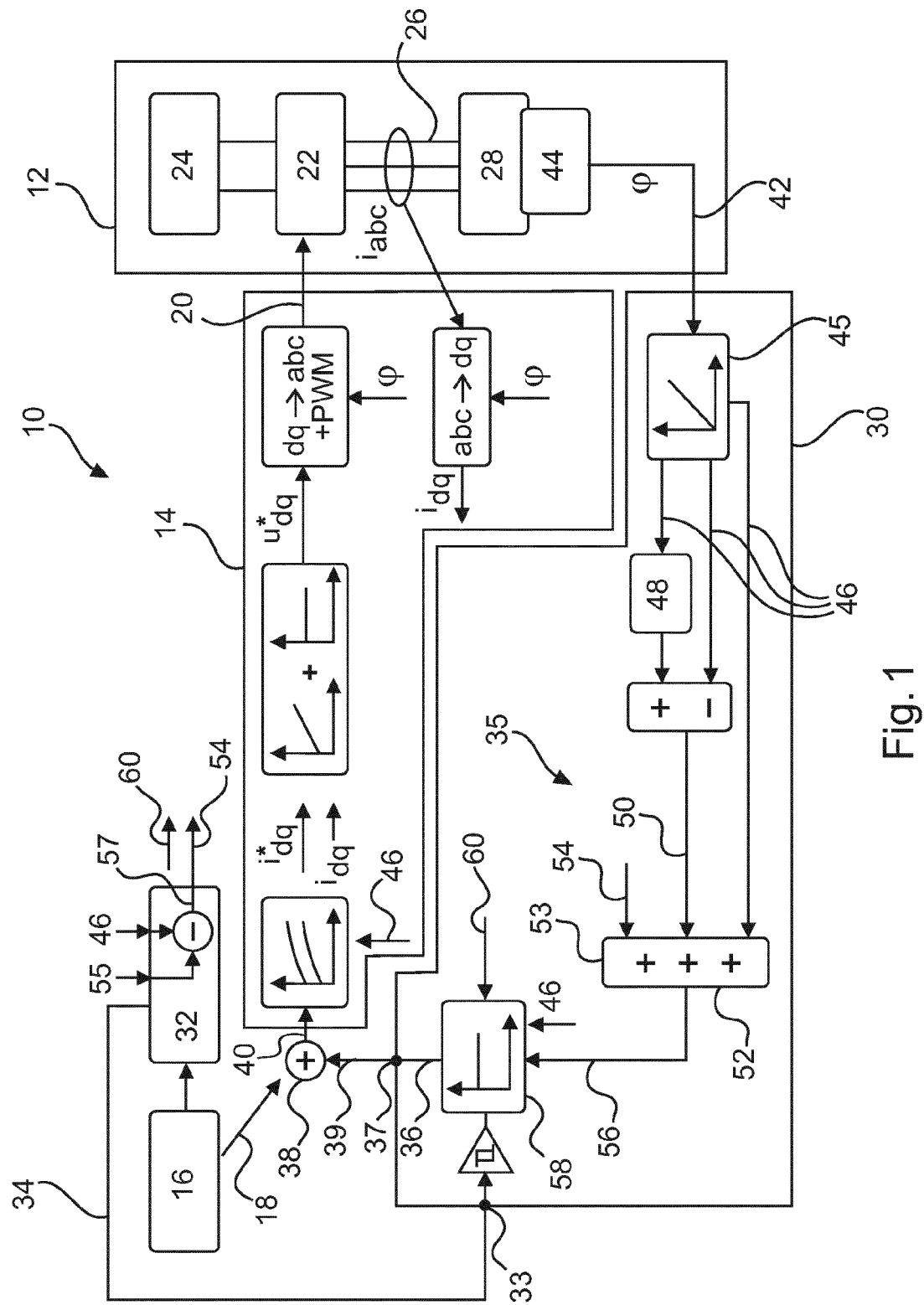
FIG. 1 shows an exemplary embodiment of the system.

The present disclosure is therefore to minimize or substantially even eliminate an uneven acceleration or a revolution rate drop during a gear shift of a towing vehicle of an articulated truck, in particular a semi-trailer, in order to avoid additional fuel consumption to compensate for the loss of speed that occurs, as well as to increase driving comfort and safety. At the same time, a cost-effective solution is to be found.

For this purpose, the device concerns a system for a vehicle trailer, in particular a semi-trailer. The system comprises a function block, for example a first control unit, with a data input, a controller, and a data output. The function block is preferably a separate control unit or is integrated into a control unit, for example a brake control unit or motor control unit. The data input is set up to receive gear shift signals of a vehicle towing the vehicle trailer. A gear shift signal indicates an imminent gear shift or the beginning of a gear shift. The vehicle towing the trailer is preferably a utility vehicle, such as a truck or the like, or a passenger car. The function block is set up to generate a torque increase request signal, which in particular includes at least one torque value, depending on the detected gear shift signal. The data output is set up to output the torque increase request signal directly or indirectly to an electric motor control unit of at least one electric drive of the vehicle trailer. The torque increase request signal indicates a request for an increase in the current torque of an electric drive which is controlled by the electric motor control unit.

Accordingly, the system is used to receive gear shift signals, which indicate the gear shift of a vehicle towing the vehicle trailer and which are provided, for example, by a vehicle control unit by means of a bus system. As a result of receiving the gear shift signal, it can be concluded that a traction force interruption is imminent or is already beginning. By controlling an electric drive of the trailer with an increased torque by means of a torque increase request signal, a traction force interruption can be responded to at an early stage. For this purpose it is assumed that the vehicle trailer has an electric drive with which a torque can be exerted on the drive wheels of the vehicle trailer.

In the case of a gear shift of the vehicle towing the vehicle trailer, by generating the torque increase request signal the system thus increases a torque of one or more electric motors of an electric drive in order to drive the vehicle towing the vehicle trailer and thus to counteract the traction force interruption. This produces a comfort advantage for the driver, as he essentially does not experience any acceleration change during the shifting process, i.e. when changing gears. Moreover, a loss of speed and thus an unintentional loss of kinetic energy are avoided, which would otherwise have to be compensated by an increased torque of the internal combustion engine after the gear shift process.

According to a first embodiment, the torque increase request signal includes at least one torque value. The torque value can be output at the data output. The system is set up to overlay torque setpoint value specifications for one or more electric motors of the electric drive of the trailer with torque values provided at the data output. Torque setpoint value specifications for one or more electric motors of the electric drive are provided by a trailer control unit, which is preferably part of the system.

Preferably, the torque setpoint value specifications are generated directly by the trailer control unit or a vehicle towing the trailer vehicle. The torque setpoint value specifications are used to control the electric drive with a desired torque of the electric motor or the electric motors of the trailer vehicle during normal driving and are, for example, dependent on a desired driving speed. This overlaying is preferably carried out by an addition element, which is also preferably part of the system. With the addition element, the overlaying is carried out by adding at least one torque value of the torque increase request signal and at least one torque setpoint value specification for at least one electric motor.

A system with the function block can thus be easily integrated into a pre-existing structure of a vehicle trailer with an electric drive and a trailer control unit.

According to a further embodiment, the function block is set up to determine torque values of the torque increase request signal depending on at least one current revolution rate value as well as a change in the revolution rate values of at least one electric motor of the electric drive of the vehicle trailer. To determine the change of the revolution rate, the function block preferably has a sample-and-hold element. Successive current revolution rate values of the electric motor or motors can be fed to the sample-and-hold element in order to determine a change in the revolution rate values. For example, sampling with the sample-and-hold element takes place at 100 ms intervals. In addition, the function block preferably has an integration element, which is used to determine the current revolution rate values from position values of position sensors of the electric motors.

Thus, a change in the speed of the vehicle can be taken into account immediately when additional thrust is provided by the vehicle trailer in the event of a gear shift and a corresponding additional thrust can be provided.

According to a further embodiment, the function block is set up to determine torque values of the torque increase request signal additionally depending on at least one slip value. The slip value can preferably be determined by forming a difference value between a specifiable reference revolution rate, for example, a reference vehicle speed, and a current revolution rate of the at least one electric motor. Slip values are preferably determined by the system itself or provided by a trailer control unit, for example by means of a bus system. The trailer control unit is, for example, an electronic trailer brake system (TEBS).

By taking into account the slip value when generating the torque value of the torque increase request signal, an additional torque in the case of a gear shift will be determined even more precisely, so that an uneven acceleration and a loss of speed are counteracted even better.

According to a further embodiment, the function block comprises an addition element to add a change in the revolution rate values of the electric motors, at least one current revolution rate value of at least one electric motor as well as one or more slip values to each other and to output the result as a total value. The addition element can also be called an adder element.

According to a further embodiment, the function block comprises a linear controller with a proportionally reinforcing behavior, with which the torque values of the torque increase request signal can be generated from the total values of the addition element and current revolution rate values of the at least one electric motor. The torque values of the torque increase request signal are thus determined depending on the total values generated with the addition element as well as current revolution rate values of the at least one electric motor.

According to a further embodiment, the function block is set up to receive a gear shift signal, which is a gear shift execution signal. A gear shift execution signal indicates that a gear shift is imminent or is already being executed. The function block is also set up, after receiving the gear shift execution signal, to output a torque value of the torque increase request signal, which is different from 0, until a gear shift signal is received, which is a gear shift completion signal. A gear shift completion signal indicates that a gear shift is completed. The output torque value of the torque increase request signal is preferably substantially constant from the reception of the gear shift execution signal to the reception of the gear shift completion signal and is preferably provided by the output of the linear controller.

Preferably, the torque value of the torque increase request signal is reduced to 0 after receiving the gear shift completion signal. This is done independently of the input signals of the linear controller, for example by deactivating the first controller of the function block or the function block by deactivating the linear controller.

This ensures that the function block outputs a torque increase request signal with a torque value in particular as long as a gear shift is being carried out, thus counteracting a traction force interruption over the entire gear shift process. On the other hand, after the completion of the gear shift, the torque value of the torque increase request signal is reduced to 0 again in order to no longer actively intervene in the control of the electric motors of the vehicle trailer and thus not in the drive control of the vehicle trailer and an articulated truck as a whole.

According to a further embodiment, the function block is set up to first receive a gear shift signal which is a gear shift announcement signal before receiving a gear shift signal which is a gear shift execution signal. In addition, the device is set up to output at the data output a torque value of the torque increase request signal, which is increased in one or more steps or continuously after receiving the gear shift announcement signal at least until the reception of the gear shift execution signal.

Thus, just before the execution of an upcoming gear shift, a gear shift announcement signal is received, with which it is announced that the gear shift is imminent. Increasing the torque value of the torque increase request signal is already started at this moment, in order to avoid an abrupt increase of a torque of the electric drive when performing the gear shift. This overcomes play in the king pin of a manual transmission, so that a systematic change during shifting is reduced or prevented.

According to a further embodiment, the function block has an activated state and a deactivated state, wherein the system is set up to output a torque value of 0 at the output of the function block in the deactivated state of the function block and to change from the deactivated to the activated state after receiving a gear shift signal which is a gear shift announcement signal or a gear shift execution signal, and to switch from the activated state to the deactivated state after receiving a gear shift signal which is a gear shift completion signal. The activated state is preferably produced by activating the linear controller and the deactivated state by deactivating the linear controller.

This ensures that a torque increase request signal is only generated in the case of an actual gear shift. The function block thus has no influence on the torque setpoint value specifications for the electric drive provided by the trailer control unit during normal driving.

According to a further embodiment, the system comprises at least one sensor or is set up to be connected to at least one sensor. The sensor is set up to detect driving conditions of the trailer, for example cornering and/or downhill driving. These special driving conditions can thus be taken into account in the generation of the torque demand signal.

According to a further embodiment, the sensors include at least one yaw rate sensor and/or at least one inclination sensor and/or at least one accelerometer sensor and/or multiple revolution rate sensors and/or multiple rotary position sensors, wherein the revolution rate sensors or rotary position sensors are set up to detect revolution rates of wheels of the vehicle trailer on different sides of the vehicle trailer. Such sensors are available as standardized components and are used to detect special driving conditions of the vehicle trailer in a simple way. In particular, at least two such sensors are present in a vehicle trailer to perform a functionality for an anti-lock system (ABS) and are used by the present system.

According to a further embodiment, the function block is set up to output different torque setpoint values of the torque increase request signal for different electric motors at the output of the first controller of the function block. When cornering or in particular driving conditions, an axle-dependent or wheel-dependent torque increase can be carried out during the gear shift in order to stabilize a driving condition.

According to a further embodiment, the system is set up to be prevented from switching from the deactivated state to the activated state or to be deactivated after receiving a gear shift signal, which is a gear shift announcement signal or a gear shift execution signal, by the detection of a predefined condition, for example a predefined vehicle condition, such as cornering.

A torque increase is therefore not carried out for example in certain detected driving conditions of the vehicle trailer, even if a gear shift takes place, in order to ensure that the driving stability of the articulated truck or semi-trailer is not endangered.

According to a further embodiment, the function block is set up to receive gear shift signals, and preferably slip values, from a bus system, in particular a CAN bus. Alternatively, the system is set up to generate gear shift signals itself depending on a wish to accelerate detected by a gas pedal position in connection with a detectable loss of speed.

In particular by specifying via a bus system, already existing information about an impending or executed gear shift can thus be used with the block function in a simple way.

According to a further embodiment, the system comprises a vehicle trailer with an electric drive. The electric drive comprises an energy store and an inverter for generating an alternating voltage from the DC voltage of an energy store. In addition, the electric drive comprises one or more electric motors for generating a torque from the alternating current as well as an electric motor control unit for controlling the inverter.

According to a further embodiment, the system also comprises a towing vehicle. The towing vehicle is preferably a utility vehicle, such as a truck or the like, or a passenger car for towing the vehicle trailer. Preferably, the towing vehicle also has a function block.

In addition, the present disclosure relates to a method for operating a system according to any one of the embodiments mentioned above.

Here, FIG. 1 shows a first exemplary embodiment of the system 10 for a vehicle trailer. The system 10 comprises an electric drive 12 for driving the vehicle trailer. The electric drive 12 is controlled by an electric motor control unit 14. The electric motor control unit 14 is supplied with torque setpoint value specifications 18 by a trailer control unit 16. Depending on the torque setpoint value specifications 18, the electric motor control unit 14 generates control signals 20 for controlling an inverter 22, which produces an alternating voltage 26 from a DC voltage of an energy store 24, for example a battery or an accumulator, and controls electric motors 28 of the electric drive 12 using the AC voltage.

According to the present disclosure, the system 10 comprises a function block 30. The function block 30 is connected to a bus system 32 via a data input 33 and is set up to receive gear shift signals 34 from the bus system 32. Depending on the gear shift signals 34, which indicate that a vehicle is performing a gear shift or that a gear shift is imminent, the function block 30 generates a torque increase request signal 36 with a first controller 35. This torque increase request signal 36 includes at least one torque value 39 and is output at the data output 37. In addition, the system 10 comprises an addition element 38, which receives torque values 39 of the torque increase request signal 36 on the one hand and torque setpoint value specifications 18 of the trailer control unit 16 on the other hand and adds them. The addition result is then fed to the electric motor control unit 14. The electric motor control unit 14 generates a control signal 20 for controlling the inverter 22 of the electric drive 12 from this addition result 40. The control signal 20 is a pulse value modulated signal (PWM).

For generating the torque values 39 of the torque increase request signal 36, position signals 42 of position sensors 44 of the electric drive 12 are fed to the function block 30. The function block 30 then has an integration element 45, which determines current revolution rate values 46 of or the electric motors 28 of the electric drive 12 from the position signals 42. The revolution rate values 46 are fed to a sample-and-hold element 48 and a change of the revolution rate values 50 of one or more of the electric machines 28 of the electric drive 12 is determined by forming the difference of an output of the sample-and-hold element 48 with at least one current revolution rate value 46. In an evaluation element 52, which is in the form of a further addition element 53 here, changes of the revolution rate values 50 and current revolution rate values 46 are then added together with one or more slip values 54. The slip values 54 are provided to the function block 30 via a bus system 32, for example, wherein then the trailer control unit 16 determines the slip values 54 and sends them out via the bus system 32. For this purpose, the trailer control unit 16 receives a predetermined reference revolution rate 55 and a current revolution rate 46 of at least one electric motor 28 and forms a difference value 57. The difference value 57 is then output as a slip value 54.

The addition result, which can also be called a total value 56, is fed to a linear controller 58. In the case of a gear shift signal 34 which indicates an imminent gear shift or the execution of a gear shift, the linear controller 58 generates a torque value of the torque increase request signal 36 with the electric motor control unit 14 to increase the torque of the electric motors 28 to above a torque setpoint value specification 18 from the trailer control unit 16.

The function block 30 additionally receives an activation signal 60 to activate or deactivate the function block 30, or in particular the linear controller 58, in order to suppress the generation of a torque increase request signal 36 in the case of certain driving situations or driving conditions despite an impending or executed gear shift. This can be the case when cornering, for example. The switch-on signal 60 is also received in the present case by the bus system 32 and generated by the trailer control unit 16.

Figure 2:
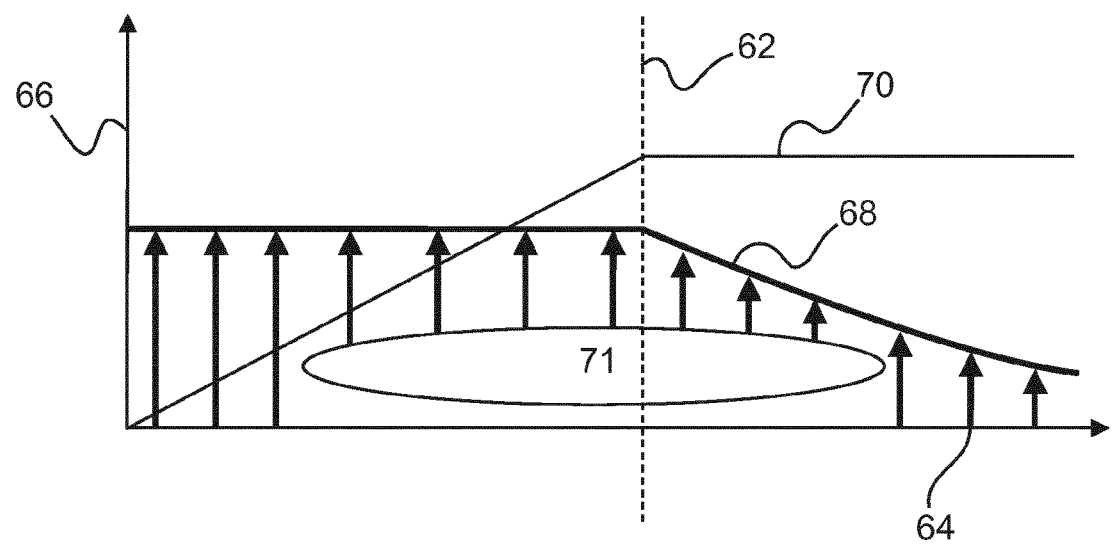
FIG. 2 shows an additional torque that can be provided by an electric drive depending on the speed of the vehicle.

FIG. 2 shows that the torque of an electric drive 12 is only constant up to the so-called corner revolution rate 62 of a revolution rate of an electric drive. Thus, with increasing revolution rate, which is plotted along the axis 64, the full desired torque can no longer be provided by the electric machines 28 from the corner revolution rate 62. As already stated, FIG. 2 shows in detail the speed of the vehicle trailer, which is plotted along the axis 64. On the vertical axis 66, on the one hand, the torque provided by the electric drive is plotted on the curve 68, wherein the energy used for this purpose is represented by the curve 70. With increasing speed, therefore, the energy required to provide a constant torque increases up to the above-mentioned corner revolution rate 62. From the corner revolution rate, no more energy can be provided, which is represented by a plateau in the curve 70, while the torque which can be provided by the electric drive 12 decreases from the corner revolution rate 62. In addition, FIG. 2 shows that an electric drive 12 usually has a region with the highest efficiency. This is represented by the region 71.

Figure 3:
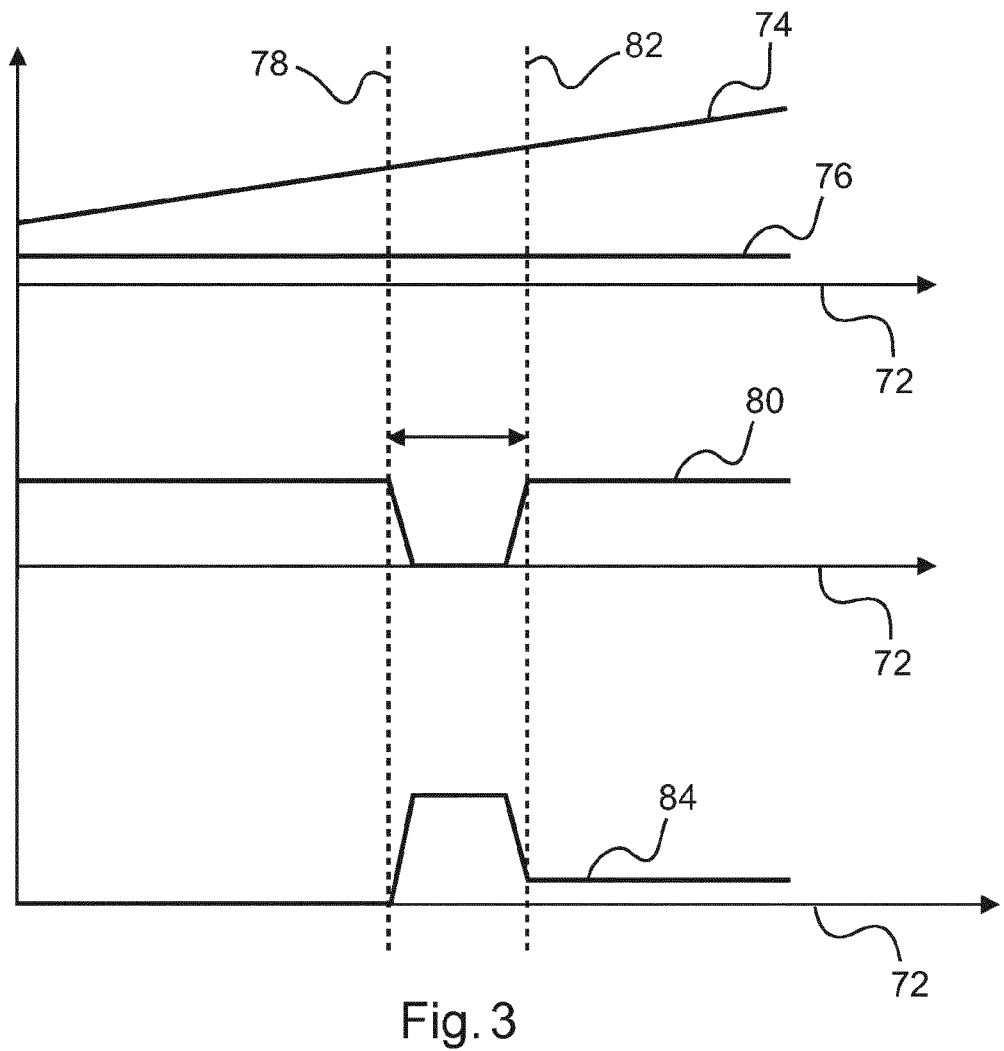
FIG. 3 shows a gear shift at a low vehicle speed.

A first shift process is shown in FIG. 3 as an example, wherein operation of the electric drive 12 below the corner revolution rate 62 is shown here, for example. For this purpose, time is plotted on the axis 72. The revolution rate of an electric motor 28 is shown by the curve 74, wherein this increases and thus indicates an increase in the revolution rate values or the speed of the vehicle. At the same time, a change in the revolution rate represented by the curve 76 remains constant. In the case of a gear shift, which is carried out from point 78, the torque provided by a drive of a towing vehicle and represented by the curve 80 will decrease. The torque accordingly increases again after the gear shift, which is represented by the time 82. An additional torque is provided by the electric machine in this period, which is for example 400 ms long, between the time of the start of the gear shift 78 and the time 82 of the end of the gear shift. This is shown by the curve 84. On the basis of curve 74 it can be seen that a continuous acceleration occurs despite a gear shift.

Figure 4:
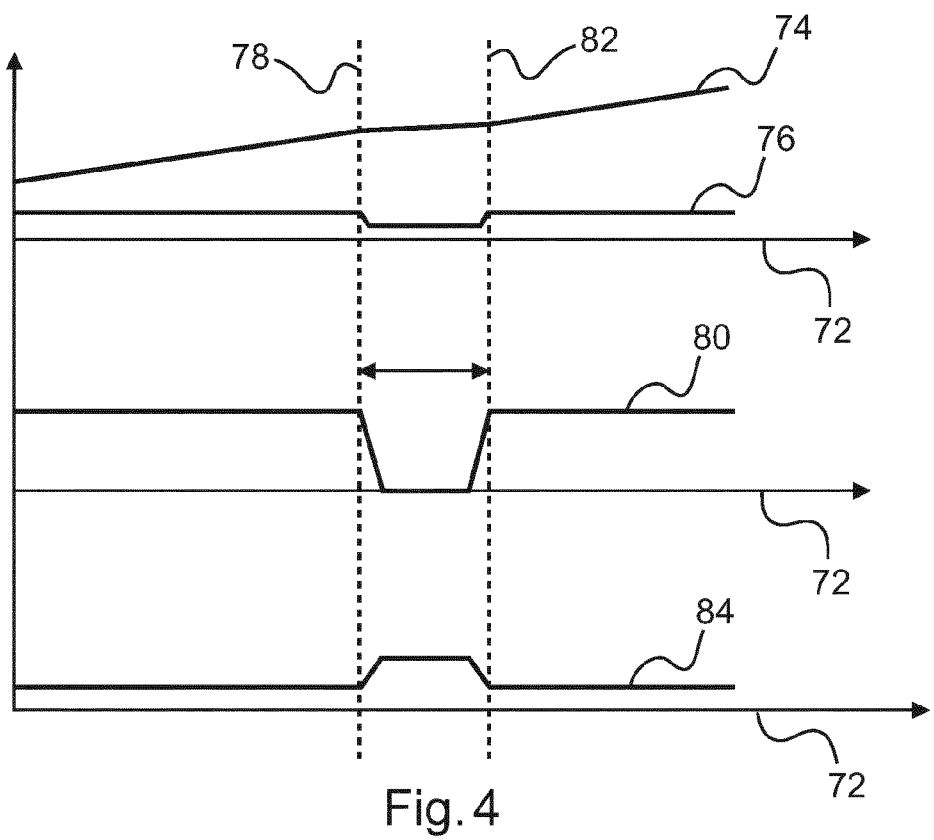
FIG. 4 shows another example of a shift process.

FIG. 4 shows the process from FIG. 3, wherein here the situation is shown in which the electric drive 12 is, for example, in an operating region above the corner revolution rate 62. It can be seen that the curve 74 rises to a comparatively lesser extent during the gear shift, so that a continuous increase of the revolution rate no longer takes place.

Figure 5:
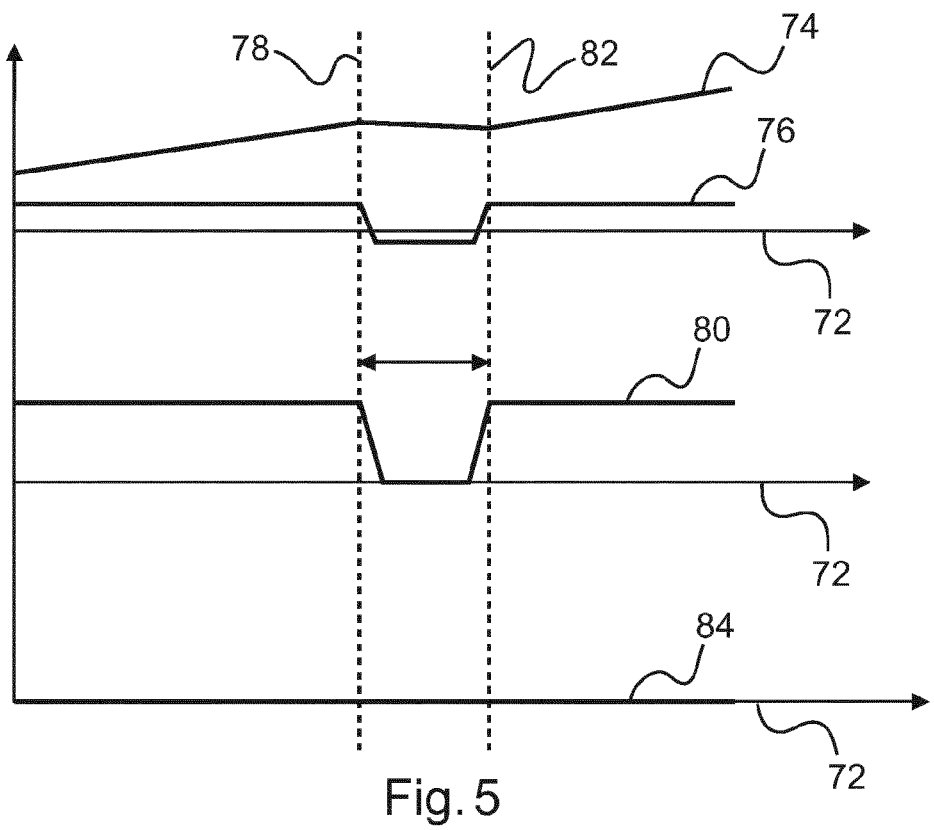
FIG. 5 shows another example of a shift process.

Finally, FIG. 5 shows the case in which the curve 74 even has a small drop during the gear shift, since for example no supporting torque can be generated by the electric drive 12 at very high speeds.

Figure 6:
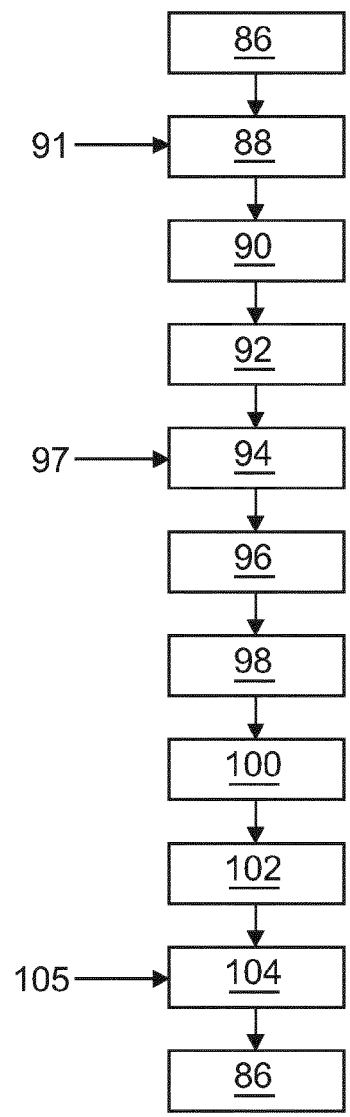
FIG. 6 shows the steps of a method according to an exemplary embodiment.

Finally, FIG. 6 shows the steps of an exemplary embodiment of the method. The system 10 is initially in a deactivated state 86. In step 88, the function block 30 receives a gear shift signal 34, which is a gear shift announcement signal 91. As a result, the system 10 changes to an activated state 90 and a predetermined low torque value 39 of a torque increase request signal 36 is output in a step 92. In a step 94 a gear shift execution signal 97 is then received and based on this gear shift signal 34 the function block 30 determines a torque value 39 of a torque increase request signal 36 in a step 96. In a step 98, the torque value 39 of the torque increase request signal 36 is output from the function block 30 at a data output 37 and is fed to an addition element 38. In the step 100, the torque value 39 of the torque increase request signal 36 is added to a torque setpoint value specification 18 in the addition element 38 and is fed to an electric motor controller 14 in order to increase the torque of the electric motors 28 of an electric drive 12 compared to the torque setpoint value specification 18 in a step 102. In the step 104, the function block 30 receives a gear shift completion signal 105, so that the system 10 reverts to a deactivated state 86.

Figure 7:
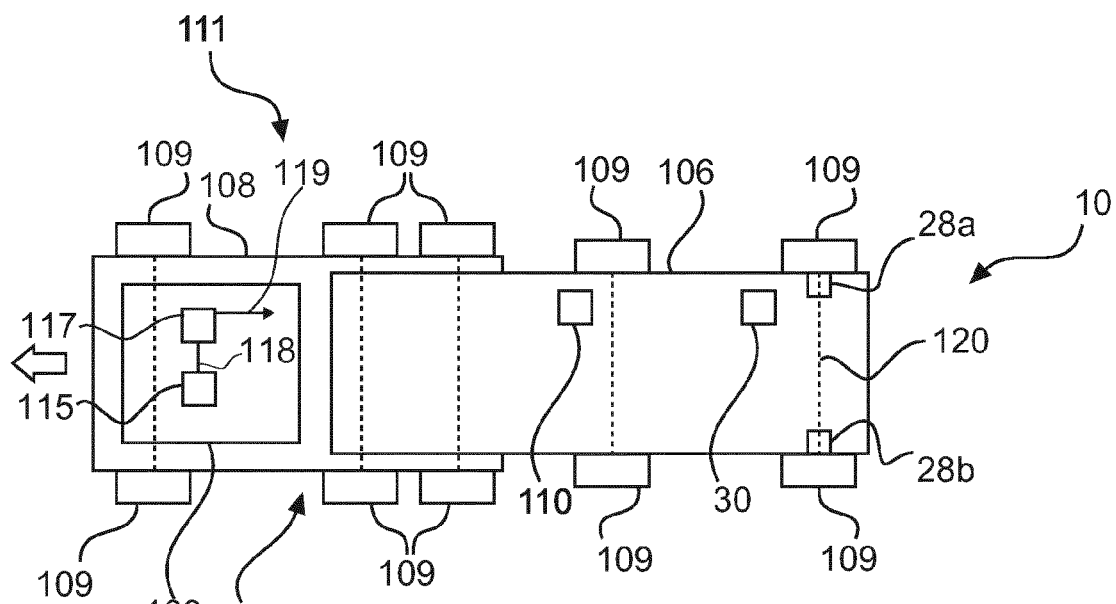
FIG. 7 shows a system having vehicle trailer towed by a towing vehicle.

FIG. 7 shows a system 10 which has a vehicle trailer 106 with the function block 30, which is towed by a towing vehicle 108. The vehicle trailer 106 and the towing vehicle 108 have multiple wheels 109. The figure is a plan view, so that in the direction of travel 107 there are a right side 105 and a left side 103. The wheels 109 which are arranged on the rear axle 120 each have an electric motor 28a, 28b. The vehicle trailer 106 has a sensor 110. In addition, the towing vehicle 108 has a driver's cab 113. The driver's cab 113 has control elements, such as a gas pedal 115. A gas pedal position 118 is output from the gas pedal 115 to a vehicle control unit 117, which exchanges data with the trailer control unit 16. The gas pedal position 118 is interpreted in the vehicle control unit 117 as the wish to accelerate 119 of the driver and a drive is controlled accordingly.

Figure 8:
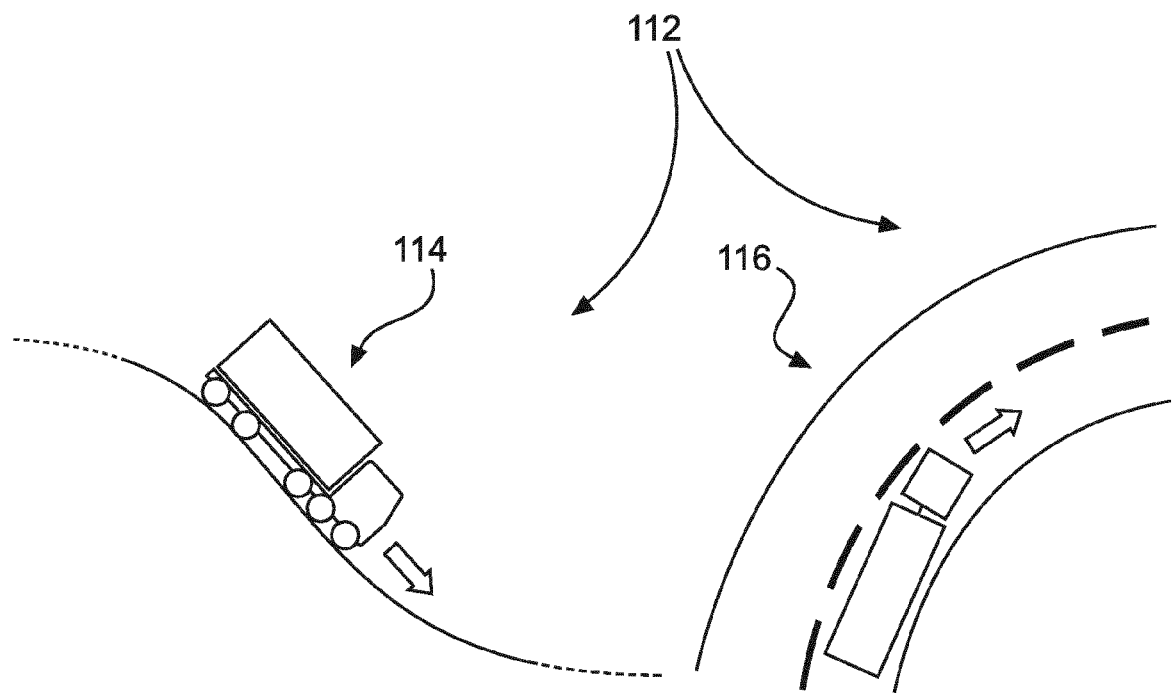
FIG. 8 shows two driving states of a towing vehicle towing a vehicle trailer.

FIG. 8 schematically shows two driving states 112 of a towing vehicle 108 which is towing a vehicle trailer 106. On the left, a drive 114 downhill and on the right, a drive 116 round a bend is shown.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

10 System
12 Electric drive

14 Electric motor control unit
16 Trailer control unit
18 Torque setpoint value specification
20 Control signals
22 Converter
24 Energy store
26 AC voltage
28, 28a, 28b Electric motors
30 Function block
32 Bus system
33 Data input
34 Gear shift signal
35 Controller
36 Torque increase request signal
37 Data output
38 Addition element
39 Torque value
40 Addition result
42 Position signals
44 Position sensors
45 Integration element
46 Current revolution rate values
48 Sample-and-hold element
50 Changing the revolution rate values
52 Evaluation element
53 Addition element
54 Slip value
55 Predetermined reference revolution rate
56 Total value
57 Difference value
58 Linear controller
60 Activation signal
62 Corner revolution rate
64 Speed axis
66 Torque axis
68 Torque curve
70 Energy curve
71 Region
72 Time axis
74 Revolution rate curve
76 Revolution rate change curve
78 Time of start of gear shift
80 Torque curve
82 Time of end of gear shift
84 Torque curve
86 Deactivated state
88 Step of the method
90 Activated state
91 Gear change announcement signal
92-96 Steps of the method
97 Gear change execution signal
98-102 Steps of the method
103 Left side
104 Step of the method
105 Gear change completion signal
106 Vehicle trailer
107 Direction of travel
108 Towing vehicle
109 Wheels
110 Sensor
111 Right side
112 Driving conditions
113 Driver's cab
114 Downhill
115 Gas pedal
116 Curve
117 Vehicle control unit
118 Gas pedal position
119 Wish to accelerate
120 Rear axle

The invention claimed is:

1. A system for a vehicle trailer, in particular a semi-trailer, comprising:
a function block having a data input configured to receive gear shift signals of a vehicle, in particular a utility vehicle, towing the vehicle trailer, the function block comprising:
a controller configured to generate a torque increase request signal depending on a received gear shift signal of the gear shift signals, and
a data output configured to output the torque increase request signal to an electric motor controller of at least one electric drive of the vehicle trailer.

2. The system as claimed in claim 1, wherein the torque increase request signal includes at least one torque value and the function block is configured to overlay torque values of the torque increase request signal provided at the data output on torque setpoint value specifications for at least one electric motor, in particular by summation with an addition element, wherein the torque setpoint value specifications are preferably provided by a trailer controller of the system.

3. The system as claimed in claim 1, wherein the function block is set up to determine the torque value of the torque increase request signal depending on at least one current revolution rate value and a change in the revolution rate values of at least one electric motor, wherein for determining the change of the revolution rate values the function block preferably has a sample-and-hold element, to which successive current revolution rate values are configured to be fed, and preferably an integration element for determining current revolution rate values from position signals received from position sensors of the electric motors.

4. The system according to claim 1, wherein the function block is set up to determine a torque value of the torque increase request signal additionally depending on at least one slip value, wherein a slip value is preferably determined by forming a difference value between a predeterminable reference revolution rate and a current revolution rate of at least one electric motor.

5. The system as claimed in claim 3, wherein the function block has an evaluation element, which is an addition element, for evaluating changes in the current revolution rate values, current revolution rate values and slip values, in particular by adding up and forming a total value, to form the torque increase request signal.

6. The system as claimed in claim 5, wherein the function block has a linear controller with a proportionally reinforcing behavior, to which the total values of the addition element are already available, for producing torque values of the torque increase request signal.

7. The system according to claim 1, wherein the function block is configured to, after receiving a gear shift signal which is a gear shift execution signal, to output a torque value of the torque increase request signal which is different from 0 until the reception of a gear shift signal which is a gear shift completion signal, wherein the torque value of the torque increase request signal is substantially constant.

8. The system according to claim 1, wherein the function block is set up, before receiving a gear shift signal which is a gear shift execution signal, first to receive a gear shift signal which is a gear shift announcement signal and is further set up to output a torque value at the data output which is increased in one or more steps or continuously after the reception of a gear shift announcement signal at least until the reception of the gear shift execution signal.

9. The system according to claim 1, wherein the function block has an activated state and a deactivated state and is configured to output a torque value of 0 at the output in the deactivated state, to change from the deactivated state to the activated state after receiving a gear shift signal which is a gear shift announcement signal or a gear shift execution signal, and to switch from the activated state to the deactivated state after receiving a gear shift signal which is a gear shift completion signal.

10. The system according to claim 1, wherein the system comprises at least one sensor or is connected to at least one sensor, wherein the sensor is set up to detect driving conditions of the trailer, in particular cornering and/or downhill travel.

11. The system as claimed in claim 10, wherein the sensor comprises a yaw rate sensor and/or an inclination sensor and/or an acceleration sensor and/or multiple revolution rate sensors and/or rotary position sensors, wherein the revolution rate sensors and/or rotary position sensors are configured to detect revolution rates of wheels of the trailer on different sides of the vehicle trailer.

12. The system according to claim 1, wherein the function block is set up to be prevented from changing from the deactivated state to the activated state or from changing to the deactivated state by the detection of a predefined condition, in particular detection of cornering of the vehicle trailer, after receiving a gear shift signal which is a gear shift announcement signal or a gear shift execution signal.

13. The system according to claim 1, wherein the function block is configured to output different torque setpoint values at the data output for different electric motors.

14. The system according to claim 1, wherein the function block is configured to receive gear shift signals and/or slip values from a bus system, in particular a CAN bus, or to detect these depending on a wish to accelerate that can be detected from a gas pedal position in conjunction with a detectable loss of speed of a towing vehicle.

15. A vehicle trailer, comprising:
   a system according to claim 1,
   an electric drive, the electric drive comprising:
      an energy store,
      an inverter configured to generate an alternating current from the energy in the energy store,
      one or more electric motors, and
      an electric motor controller configured to control the inverter.

16. The vehicle trailer as claimed in claim 15, wherein the vehicle trailer is configured to be towed by a towing vehicle, in particular a utility vehicle, or is coupled to the towing vehicle, wherein the towing vehicle preferably has a further function block and an electric drive.

17. A method for operating a system according to claim 1, the method comprising:
   receiving a gear shift signal,
   generating a torque increase request signal depending on the gear shift signal and
   outputting the torque increase request signal to an electric motor controller.

* * * * *